(12) United States Patent
Oh et al.

(10) Patent No.: US 8,021,781 B2
(45) Date of Patent: Sep. 20, 2011

(54) JELLY-ROLL TYPE ELECTRODE ASSEMBLY AND SECONDARY BATTERY EMPLOYING THE SAME

(75) Inventors: Dong-Young Oh, Cheonan-si (KR); Jeong-Won Oh, Cheonan-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 1800 days.

(21) Appl. No.: 10/832,343

(22) Filed: Apr. 27, 2004

(65) Prior Publication Data
US 2005/0003264 A1 Jan. 6, 2005

(30) Foreign Application Priority Data
May 26, 2003 (KR) .................. 10-2003-0033340

(51) Int. Cl.
*H01M 4/02* (2006.01)
*H01M 4/70* (2006.01)
(52) U.S. Cl. .............. 429/211; 429/94; 429/234
(58) Field of Classification Search .......... 429/211, 429/94, 234
See application file for complete search history.

(56) References Cited

U.S. PATENT DOCUMENTS

| | | | |
|---|---|---|---|
| 5,976,729 A | 11/1999 | Morishita et al. | |
| 6,258,480 B1 | 7/2001 | Moriwaki et al. | |
| 6,746,796 B2 * | 6/2004 | Watanabe et al. | 429/94 |
| 7,033,697 B2 * | 4/2006 | Park et al. | 429/211 |
| 7,132,194 B2 * | 11/2006 | Mizutani | 429/94 |

FOREIGN PATENT DOCUMENTS

| | | |
|---|---|---|
| CN | 1140937 C | 3/2004 |
| JP | 11-329408 | 11/1999 |
| JP | 2000-67907 | 3/2000 |
| JP | 2001-210381 | 8/2001 |
| JP | 2001210381 A * | 8/2001 |
| JP | 2002-324569 | 11/2002 |
| WO | WO 2003017411 A1 * | 2/2003 |

OTHER PUBLICATIONS

Office Action issued in Chinese Patent Application No. 2004100434308 on Mar. 16, 2007.
Certificate of Patent for Invention issued in Chinese Patent No. ZL 200410043430.8 on Feb. 4, 2009.

* cited by examiner

*Primary Examiner* — Tracy Dove
(74) *Attorney, Agent, or Firm* — Knobbe Martens Olson & Bear LLP

(57) ABSTRACT

A jelly-roll type electrode assembly having a negative electrode plate having a negative electrode coated portion coated with a negative electrode active material layer, and a negative electrode uncoated portion disposed at an end of the negative electrode plate that is near a center of the electrode assembly, a positive electrode plate having a positive electrode coated portion coated with a negative electrode active material layer, and a positive electrode uncoated portion disposed at an end of the positive electrode plate that is near the center of the electrode assembly, a separator between the negative electrode plate and the positive electrode plate, and a negative electrode tab and a positive electrode tab electrically connected to the negative electrode uncoated portion and the positive electrode uncoated portion, respectively, wherein a width of the negative electrode uncoated portion is approximately 2 to 3 times that of the negative electrode tab.

1 Claim, 4 Drawing Sheets

JELLY-ROLL TYPE ELECTRODE ASSEMBLY AND SECONDARY BATTERY EMPLOYING THE SAME

CROSS-REFERENCE TO RELATED APPLICATIONS

This application claims the priority of Korean Patent Application No. 2003-33340, filed May 26, 2003, in the Korean Intellectual Property Office, the disclosure of which is incorporated herein in its entirety by reference.

BACKGROUND OF THE INVENTION

1. Field of the Invention

The present invention relates to a secondary battery, and, more particularly, to a jelly-roll type electrode assembly having an improved structure to minimize deformation occurring during winding of a negative electrode, a positive electrode, and a separator, and a secondary battery using the electrode assembly.

2. Description of the Related Art

In general, unlike primary batteries, which are not rechargeable, secondary batteries are capable of recharging. Secondary batteries are widely used in various applications, including advanced portable electronic devices such as cellular phones, notebook computers, and camcorders. Specifically, lithium secondary batteries, which operate at 3.6 V, are being actively developed. This is because the operating voltage of the lithium secondary battery is approximately 3 times higher than that of nickel-cadmium (Ni—Cd) batteries or nickel-hydride (Ni-MH) batteries, which are also widely used as power sources for electronic devices, and because they have excellent energy density per unit weight.

In general, a secondary battery employs a lithium oxide as a positive active material, and a carbon material as a negative active material. Such a secondary battery can be classified into a liquid electrolyte cell and a polymer electrolyte cell, according to the kind of electrolyte used. Batteries using a liquid electrolyte are generally referred to as lithium-ion batteries, and batteries using a polymer electrolyte are referred to as lithium-polymer batteries. The lithium secondary batteries are manufactured in various shapes, typically cylindrical, rectangular, and pouch shapes. In particular, a pouch type secondary battery, which has a pouch as a casing, is preferred because the energy density per weight and energy density per volume can be increased. Also thin, lightweight batteries can be attained, and the material cost for the casing can be reduced.

Such a conventional secondary battery having a pouch as a casing is shown in FIG. 1. Referring thereto, a secondary battery 10 includes a pouch-shaped casing 11 with an electrode assembly 20 accommodated therein. The pouch-shaped casing 11 is hermetically sealed around the electrode assembly 20.

The casing 11 includes a cover 12 and a case 13. The electrode assembly 20 is accommodated in the case 13, and the cover 12 and the case 13, which will be hermetically sealed together, are coupled to each other.

The electrode assembly 20 is configured such that a negative electrode plate and a positive electrode plate are formed by coating an active material on a current collector, drying the material, roll-pressing, and cutting. A separator is interposed between the negative and positive electrode plates, and the resultant laminate is wound in a jelly-roll type structure. A negative electrode tab 23 and a positive electrode tab 24 are led from the negative electrode plate and positive electrode plate, respectively.

In the electrode assembly having the configuration described above, winding start portions of the negative and positive electrode plates are shown in FIG. 2. Referring thereto, the negative electrode plate 21 includes a strip-shaped negative current collector 21a, a negative electrode coated portion 21b on which a negative electrode active material is formed, and a negative electrode uncoated portion 21c on which the negative electrode active material is not formed. The negative electrode coated portion and the negative electrode uncoated portion are positioned on the strip-shaped negative electrode current collector 21a. Likewise, the positive electrode plate 22 includes a strip-shaped positive current collector 22a, a positive electrode coated portion 22b on which a positive electrode active material is formed, and a positive electrode uncoated portion 22c on which the positive electrode active material is not formed. The positive electrode coated portion and the positive electrode uncoated portion are positioned on the strip-shaped positive electrode current collector 22a. The negative electrode tab 23 and the positive electrode tab 24 are fixedly disposed on the negative electrode uncoated portion 21c and the positive electrode uncoated portion 22c, respectively, by welding, and protrude from the negative electrode plate 21 and the positive electrode plate 22, respectively. The negative electrode uncoated portion 21c having the negative electrode tab 23, and the positive electrode uncoated portion 22c having the positive electrode tab 24, correspond to the winding start portions in a winding.

The thus-formed positive and negative electrode plates are wound with porous separators in a jelly roll configuration as shown in FIG. 3. Referring thereto, two sheets of separators, that is, first and second separators 25a and 25b, are first wound around a non-circular mandrel 30 by a predetermined length. The negative electrode plate 21, having the negative electrode uncoated portion 21c at its leading edge, is disposed between the first and second separators 25a and 25b which have been partially wound, and the positive electrode plate 22, having the positive electrode uncoated portion 22c at its leading edge, is disposed on the outer face of the first separator 25a. The positive electrode plate 22 is wound with the first and second separators 25a and 25b a predetermined length after the leading edge of the negative electrode plate 21.

The negative electrode uncoated portion 21c is relatively long, and is generally thinner than the positive electrode uncoated portion 22c. Thus, the negative electrode uncoated portion 21c is susceptible to deformation, e.g., crumpling, during an initial winding stage. Winding of the negative electrode uncoated portion 21c in a deformed state may cause damages to the first and second separators 25a and 25b, which face both surfaces of the negative electrode uncoated portion 21c, resulting in a short-circuit between the negative electrode plate 21 and the positive electrode plate 22, or misplacement of the negative electrode tab 23, which is attached to the negative electrode uncoated portion 21c.

SUMMARY OF THE INVENTION

The present invention provides a secondary battery which can prevent misalignment of electrode tabs by minimizing deformation occurring during winding of a negative electrode, a positive electrode, and a separator, and a secondary battery using the electrode assembly.

Additional aspects and/or advantages of the invention will be set forth in part in the description which follows and, in part, will be obvious from the description, or may be learned by practice of the invention.

In accordance with an aspect of the present invention, there is provided a jelly-roll type electrode assembly comprising a negative electrode plate having a negative electrode coated portion coated with a negative electrode active material layer, and a negative electrode uncoated portion disposed at an end of the negative electrode plate that is near a center of the electrode assembly, a positive electrode plate having a positive electrode coated portion coated with a positive electrode active material layer, and a positive electrode uncoated portion disposed at an end of the positive electrode plate that is near the center of the electrode assembly, wherein the positive electrode plate is spaced a predetermined distance apart from the negative electrode plate, a separator interposed between the negative electrode plate and the positive electrode plate, to insulate the negative electrode plate from the positive electrode plate in a wound state, and a negative electrode tab and a positive electrode tab electrically connected to the negative electrode uncoated portion and the positive electrode uncoated portion, respectively, wherein a width of the negative electrode uncoated portion is approximately 2 to 3 times that of the negative electrode tab.

In accordance with another aspect of the present invention, there is provided a jelly-roll type electrode assembly comprising a negative electrode plate having a negative electrode coated portion coated with a negative electrode active material layer, and a negative electrode uncoated portion disposed at an end of the negative electrode plate that is near a center of the electrode assembly, a positive electrode plate having a positive electrode coated portion coated with a positive electrode active material layer, and a positive electrode uncoated portion disposed at an end of the positive electrode plate that is near the center of the electrode assembly, wherein the positive electrode plate is spaced a predetermined distance apart from the negative electrode plate, a separator interposed between the negative electrode plate and the positive electrode plate, to insulate the negative electrode plate from the positive electrode plate in a wound state, and a negative electrode tab and a positive electrode tab electrically connected to the negative electrode uncoated portion and the positive electrode uncoated portion, respectively, wherein a width of the positive electrode uncoated portion is wider than the negative electrode uncoated portion.

In accordance with still another aspect of the present invention, there is provided a jelly-roll type electrode assembly comprising a negative electrode plate having a negative electrode coated portion coated with a negative electrode active material layer, and a negative electrode uncoated portion disposed at an end of the negative electrode plate that is near a center of the electrode assembly, a positive electrode plate having a positive electrode coated portion coated with a positive electrode active material layer, and a positive electrode uncoated portion disposed at an end of the positive electrode plate that is near the center of the electrode assembly, wherein the positive electrode plate is spaced a predetermined distance apart from the negative electrode plate, a separator interposed between the negative electrode plate and the positive electrode plate, to insulate the negative electrode plate from the positive electrode plate in a wound state, and a negative electrode tab and a positive electrode tab electrically connected to the negative electrode uncoated portion and the positive electrode uncoated portion, respectively, wherein the positive electrode tab is disposed farther from the positive electrode coated portion than the negative electrode tab is from the negative electrode coated portion.

In accordance with another aspect of the present invention, there is provided a jelly-roll type electrode assembly comprising a negative electrode plate having a negative electrode coated portion coated with a negative electrode active material layer, and a negative electrode uncoated portion disposed at an end of the negative electrode plate that is near a center of the electrode assembly, a positive electrode plate having a positive electrode coated portion coated with a positive electrode active material layer, and a positive electrode uncoated portion disposed at an end of the positive electrode plate that is near the center of the electrode assembly, wherein the positive electrode plate is spaced a predetermined distance apart from the negative electrode plate, a separator interposed between the negative electrode plate and the positive electrode plate, to insulate the negative electrode plate from the positive electrode plate in a wound state, and a negative electrode tab and a positive electrode tab electrically connected to the negative electrode uncoated portion and the positive electrode uncoated portion, respectively, wherein a width of the negative electrode uncoated portion is approximately 2 to 3 times that of the negative electrode tab, the width of the positive electrode uncoated portion is approximately 1.5 to 3 times wider than that of the negative electrode uncoated portion, and the positive electrode tab is disposed farther from the positive electrode coated portion than the negative electrode tab is from the negative electrode coated portion.

In accordance with another aspect of the present invention, there is provided a secondary battery comprising a negative electrode plate having a negative electrode coated portion coated with a negative electrode active material layer, and a negative electrode uncoated portion disposed at an end of the negative electrode plate that is near a center of the electrode assembly, a positive electrode plate having a positive electrode coated portion coated with a positive electrode active material layer, and a positive electrode uncoated portion disposed at an end of the positive electrode plate that is near the center of the electrode assembly, wherein the positive electrode plate is spaced a predetermined distance apart from the negative electrode plate, a separator interposed between the negative electrode plate and the positive electrode plate, to insulate the negative electrode plate from the positive electrode plate in a wound state, and a negative electrode tab and a positive electrode tab electrically connected to the negative electrode uncoated portion and the positive electrode uncoated portion, respectively, wherein a width of the negative electrode uncoated portion is approximately 2 to 3 times that of the negative electrode tab, and a casing having a case in which the electrode assembly is accommodated, and a cover coupled to the case to hermetically seal the battery.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE PREFERRED EMBODIMENTS

Figure 1:
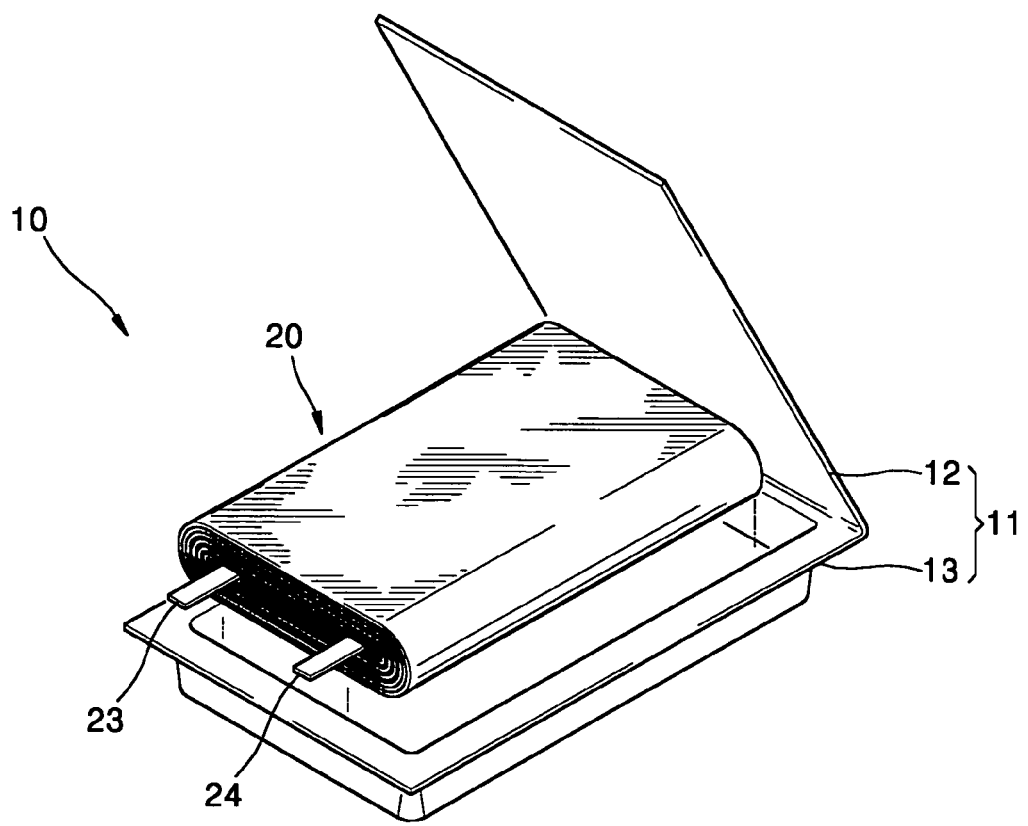
FIG. 1 is an exploded perspective view of a conventional secondary battery.

Reference will now be made in detail to the embodiments of the present invention, examples of which are illustrated in the accompanying drawings, wherein like reference numerals refer to the like elements throughout. The embodiments are described below to explain the present invention by referring to the figures.

Figure 4:
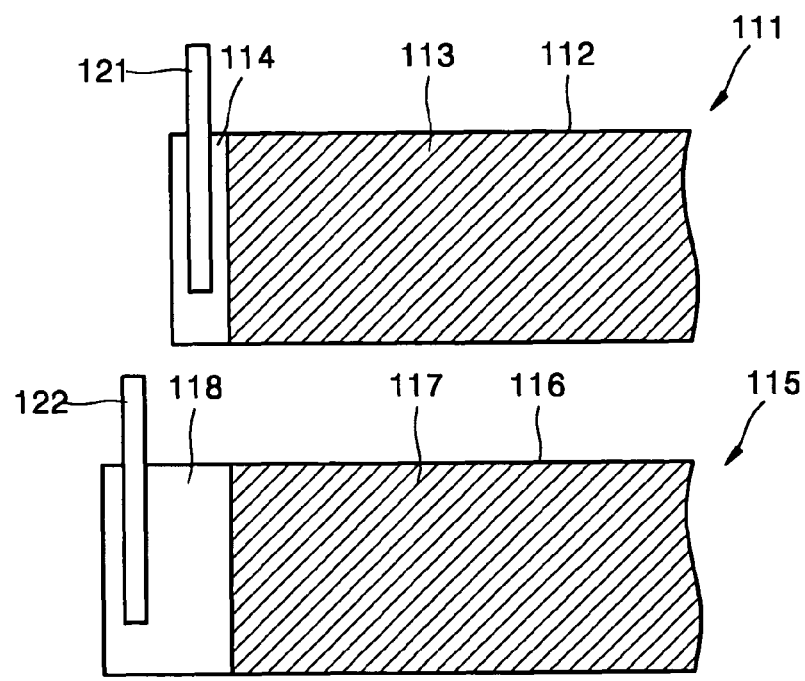
FIG. 4 is a plan view illustrating winding start portions of a negative electrode plate and a positive electrode plate in an electrode assembly according to an embodiment of the present invention.
Figure 5:
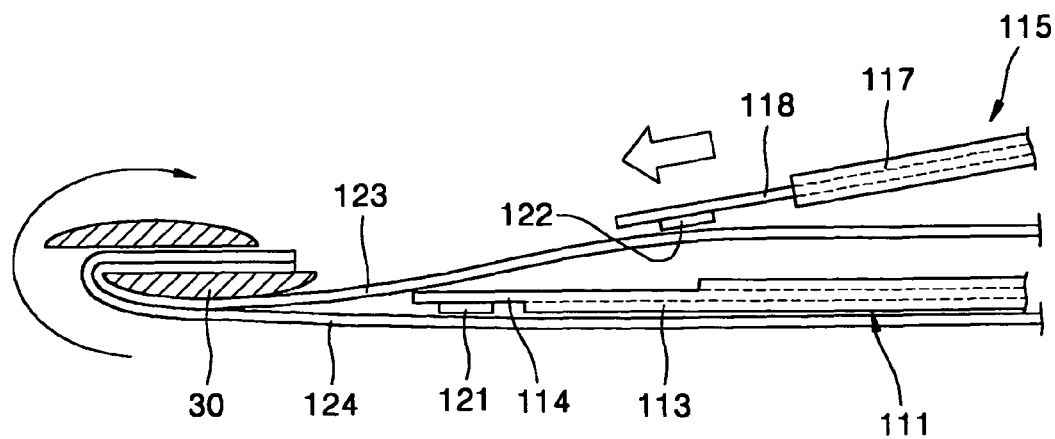
FIG. 5 is a side view illustrating a winding process in which the negative electrode plate and the positive electrode plate shown in FIG. 4 are wound with a separator.

FIG. 4 illustrates winding start portions of a negative electrode plate and a positive electrode plate in an electrode assembly according to an embodiment of the present invention, and FIG. 5 illustrates a winding process in which the negative electrode plate and the positive electrode plate electrode shown in FIG. 4 are wound with a separator.

Referring to the drawings, a negative electrode plate 111 includes a negative electrode current collector 112 made of a strip-shaped metal foil, e.g., a copper foil. The negative electrode current collector 112 has a negative electrode coated portion 113 on which a negative electrode active material is formed. A mixture compound comprising a carbon material, a binder, a plasticizer, and a conductive material may be used as the negative electrode active material layer.

The negative electrode plate 111 also includes a negative electrode uncoated portion 114 having a predetermined length, on which the negative electrode active material is not formed, on one end of the negative electrode current collector 112. The negative electrode uncoated portion 114 corresponds to a winding start portion, and is positioned at the innermost of the winding axis after winding is completed.

A positive electrode plate 115 includes a positive electrode current collector 116 made of a strip-shaped metal foil, e.g., an aluminum foil. The positive electrode current collector 116 has a positive electrode coated portion 117 on which a positive electrode active material is formed. A mixture compound comprising a lithium oxide, a binder, a plasticizer, and a conductive material may be used as the positive electrode active material layer. The positive electrode plate 115 also includes a positive electrode uncoated portion 118 having a predetermined length, on which the a positive electrode active material is not formed, on at least one end of the positive electrode current collector 116. The positive electrode uncoated portion 118 corresponds to a winding start portion, and is positioned at the innermost of a winding axis after winding is completed.

A negative electrode tab 121 is attached to the negative electrode uncoated portion 114 by a method such as welding, and is electrically connected to the negative electrode plate 111. A positive electrode tab 122 is attached to the positive electrode uncoated portion 118 by a method such as welding, and is electrically connected to the positive electrode plate 115.

Protection elements (not shown) may be installed on portions to which the negative electrode tab 121 and the positive electrode tab 122 are connected. The protection elements are provided to protect the two portions to thus prevent a short-circuit therebetween. A heat resistant material such as a polymer resin, e.g., polyester, can be used in forming the protection elements.

According to one aspect of the present invention, a width (size in the winding direction) of the negative electrode uncoated portion 114 is preferably, though not necessarily, approximately 2 to 3 times that of the negative electrode tab 121 connected to the negative electrode uncoated portion 114, which is considerably smaller than that of the negative electrode uncoated portion 21c in the conventional negative electrode plate 21. Preferably, though not necessarily, the negative electrode uncoated portion 114 has a minimum width with which to facilitate adhesion of the negative electrode tab 121.

Also, as the width of the negative electrode uncoated portion 114 is reduced, the width of the positive electrode uncoated portion 118 is increased to be substantially the same as, or larger than, the negative electrode uncoated portion 114. The width of the positive electrode uncoated portion 118 is preferably, though not necessarily, 1.5 to 3 times, and more preferably 1.5 to 2 times, wider than that of the negative electrode uncoated portion 114. Preferably, the positive electrode tab 122 is disposed close to, and is adhered to, a leading edge of the positive electrode uncoated portion 118. Accordingly, the positive electrode tab 122 is disposed farther from the corresponding coated portion than the negative electrode tab 121. In other words, the positive electrode tab 122 is ahead of the negative electrode tab 121, in view of a winding start position of the positive electrode uncoated portion 118 in the positive electrode plate 115, and a winding start portion of the negative electrode uncoated portion 114 in the negative electrode plate 111, which will later be described in more detail. Here, the winding start position of the positive electrode uncoated portion 118 corresponds to a boundary between the positive electrode coated portion 117 and the positive electrode uncoated portion 118, and the winding start portion of the negative electrode uncoated portion 114 corresponds to a boundary between the negative electrode coated portion 113 and the negative electrode uncoated portion 114.

The thus-constructed negative electrode plate and positive electrode plate are wound with a porous separator in a jelly-roll configuration, forming an electrode assembly, as shown in FIG. 5.

As shown, two sheets of separators, that is, first and second separators 123 and 124, are wound around a non-circular mandrel 30 a predetermined length earlier than the negative electrode plate 111 and the positive electrode plate 115. The negative electrode plate 111 is disposed between the first separator 123 and the second separator 124, and the positive electrode plate 115 is disposed on the outer face of the first separator 123. The first and second separators 123 and 124 insulate the positive electrode plate 111 and the negative electrode plate 115 from each other after winding, and allow active material ions to be exchanged between the positive electrode plate 111 and the negative electrode plate 115.

The negative electrode plate 111, having the negative electrode uncoated portion 114 at its leading edge, is disposed between the first and second separators 123 and 124 and then wound, and the positive electrode plate 115, having the positive electrode uncoated portion 118 at its leading edge, is disposed on the outer face of the first separator 123 and then wound a predetermined length after the leading edge of the negative electrode plate 111.

Figure 2:
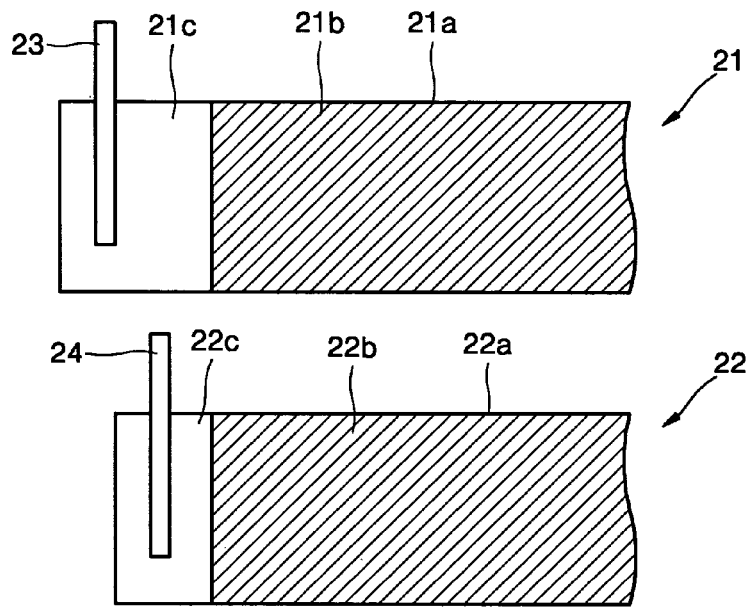
FIG. 2 is a plan view illustrating winding start portions of a negative electrode plate and a positive electrode plate of an electrode assembly shown in FIG. 1.
Figure 3:
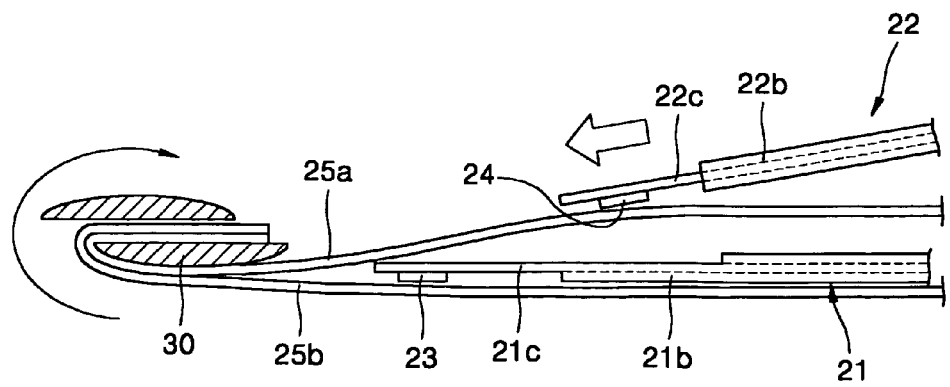
FIG. 3 is a side view illustrating a winding process of the electrode assembly shown in FIG. 1.

As described above, according to one aspect of an embodiment the present invention, a width (size in a winding direction) of the negative electrode uncoated portion 114 is approximately 2 to 3 times that of the negative electrode tab 121, which is considerably smaller than that of the conventional negative electrode uncoated portion 21c shown in FIG. 2, thereby minimizing deformation of the negative electrode uncoated portion 114, such as crumpling, during an initial winding stage. Accordingly, damages of the first and second separators 123 and 124, disposed on both surfaces of the negative electrode uncoated portion 114, can be avoided, thereby preventing a short-circuit between the negative electrode plate 111 and the positive electrode plate 115. Since deformation of the negative electrode uncoated portion 114 can be minimized, the negative electrode tab 121 connected thereto can be aligned at a proper position.

Since the negative electrode uncoated portion 114 is shorter in a widthwise direction than the conventional negative electrode uncoated portion 21c shown in FIG. 2, the negative electrode tab 121 connected to the negative electrode uncoated portion 114 is wound earlier than the negative electrode tab 23 connected to the conventional negative electrode uncoated portion 21c. In a case of using a conventional facility in order to reduce the cost, the positive electrode plate 115 is delayed in winding compared to the negative electrode plate 111, and winding lengths of the negative electrode tab 121 and the positive electrode tab 122 become substantially the same with each other. In such a case, a distance between the negative electrode tab 121 and the positive electrode tab 122 becomes considerably reduced, so that the negative electrode tab 121 and the positive electrode tab 122 may overlap each other. To avoid this, the positive electrode uncoated portion 118 is increased a predetermined length in a widthwise direction, and the positive electrode tab 122, connected to the positive electrode uncoated portion 118, is preferably shifted toward the leading edge of the positive electrode uncoated portion 118 by a predetermined length.

Figure 6:
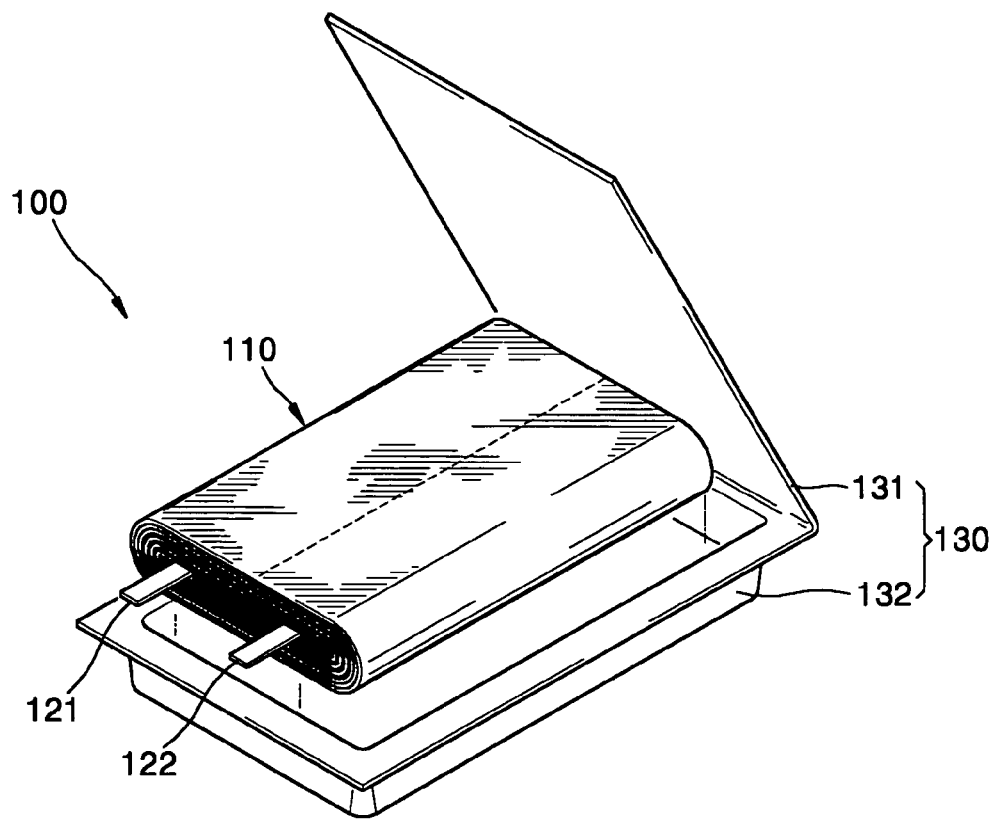
FIG. 6 is an exploded perspective view of a secondary battery employing the electrode assembly wound in such a manner as shown in FIG. 5.

In the electrode assembly 110 constructed by the negative electrode plate 111 and the positive electrode plate 115 in the above-described manner, the positive electrode tab 122 may be slightly shifted toward a winding axis, as shown in FIG. 6. However, a subsequent assembling work is not considerably affected by such shifting.

The electrode assembly 110 is compressed to be accommodated within a casing to enclose and seal the casing. When the electrode assembly 110 is defined by a longer side and a shorter side in a winding direction in view of external appearance, a ratio of the longer side to the shorter side is preferably, though not necessarily, at least 2:1.

FIG. 6 illustrates a secondary battery employing the electrode assembly having the above-described configuration.

Referring to FIG. 6, a secondary battery 100 according to the present invention includes a jelly-roll type electrode assembly 110, and a casing 130 enclosing and sealing the electrode assembly 110.

The electrode assembly 110 has the same configuration as described above, and the casing 130, having a pouch shape, includes a case 132 in which the electrode assembly 110 is accommodated, and a cover 131 to seal the case 132.

The casing 130 may be basically configured such that an insulating layer, a metal layer and a protection layer are sequentially laminated. The insulating layer, which is the innermost layer, may be formed of a material having an insulating property and a thermal adhesiveness. The metal layer prevents infiltration of moisture and loss of an electrolytic solution. The protection layer, which is the outermost layer, protects a battery body. However, the structure of the casing 130 is not limited to the lamination structure, and the casing 130 can be alternatively constructed using various structures.

In an embodiment of the casing 130, the cover 131 and an insulating layer positioned at the periphery of the innermost surface of the case 132 are thermally fused and adhered to each other, so that the cover 131 and the case 132 are connected to each other, thereby hermetically sealing the battery 100. The negative electrode tab 121 and the positive electrode tab 122, extending from the electrode assembly 110, protrude outside the casing 130. The protruding negative electrode tab 121 and positive electrode tab 122 may then be electrically connected to external circuits. In the manufacture of a secondary battery, the electrode assembly can be encased in various types of casings in addition to the above-described casing.

As described above, according to the present invention, since deformation that may occur to a negative electrode uncoated portion can be minimized during winding of a negative electrode plate with a positive electrode plate and separators, misalignment of a negative electrode tab can be prevented. Accordingly, improved assembling efficiency of a battery can be achieved. The present invention can be applied to secondary batteries so that deformation occurring during winding of a negative electrode plate with a positive electrode plate and separators can be minimized.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A jelly-roll type electrode assembly comprising:
   a negative electrode plate, comprising:
   a negative electrode coated portion coated with a negative electrode active material layer, and
   a negative electrode uncoated portion disposed at an end of the negative electrode plate that is near a center of the electrode assembly;
   a positive electrode plate, comprising:
   a positive electrode coated portion coated with a positive electrode active material layer, and
   a positive electrode uncoated portion disposed at an end of the positive electrode plate that is near the center of the electrode assembly,
   wherein the positive electrode plate is spaced a predetermined distance apart from the negative electrode plate;
   a separator interposed between the negative electrode plate and the positive electrode plate, to insulate the negative electrode plate from the positive electrode plate in a wound state; and
   a negative electrode tab and a positive electrode tab electrically connected to the negative electrode uncoated portion and the positive electrode uncoated portion, respectively;
   wherein a width of the negative electrode uncoated portion is approximately 2 to 3 times that of the negative electrode tab, the width of the positive electrode uncoated portion is approximately 1.5 to 3 times wider than the negative electrode uncoated portion, and the positive electrode tab is disposed farther from the positive electrode coated portion than the negative electrode tab is from the negative electrode coated portion, and
   wherein the negative electrode uncoated portion and the positive electrode uncoated portion correspond to winding start portions and are positioned at an innermost of a winding axis after winding is completed.

* * * * *